United States Patent [19]
Amell et al.

[11] Patent Number: 5,922,056
[45] Date of Patent: Jul. 13, 1999

[54] COMPUTER SYSTEM WITH PERIPHERAL DEVICE CHARACTERISTIC SENSING AND AUTOMATIC COMMUNICATIONS SPEED SETTING

[75] Inventors: Steven Joseph Amell, Rochester; Bruce Richard Culbertson, Kasson; Gregory Albert Dancker, Rochester, all of Minn.; William Van Durrett, Harrisburg; Kevin Malachi Galloway, Charlotte, both of N.C.; Harvey Gene Kiel; James Albert Pieterick, both of Rochester, Minn.; John Elliott Walker, York, S.C.

[73] Assignee: International Business Machines Corporation, Armonk, N.Y.

[21] Appl. No.: 08/811,098

[22] Filed: Mar. 3, 1997

[51] Int. Cl.⁶ ............................................. G06F 13/10
[52] U.S. Cl. ................................. 710/16; 710/21
[58] Field of Search .......................... 395/836, 842; 364/130

[56] References Cited

U.S. PATENT DOCUMENTS

| | | | |
|---|---|---|---|
| 3,434,117 | 3/1969 | Gibson et al. | 364/900 |
| 4,679,191 | 7/1987 | Nelson et al. | 370/84 |
| 4,837,779 | 6/1989 | Lundgren | 375/10 |
| 5,054,517 | 10/1991 | Liesenhoff et al. | 137/513.5 |
| 5,191,655 | 3/1993 | Sarkissian | 395/275 |
| 5,230,071 | 7/1993 | Newman | 395/550 |
| 5,313,454 | 5/1994 | Bustini et al. | 370/13 |
| 5,708,814 | 1/1998 | Short et al. | 395/733 |

*Primary Examiner*—Hassan Kizou
*Assistant Examiner*—Abu Hossain
*Attorney, Agent, or Firm*—Dan Hubert; Terrance A. Meador; Matthew J. Bussan

[57] ABSTRACT

A computer system automatically senses characteristics of diverse peripheral devices connected to a common communications port, and automatically maximizes the communications speed with the devices. Coupled in daisy chain fashion to the communications port, all peripheral devices receive every signal issued from the controller port, each device responding only to signals addressed to that device or signals addressed to a universal address. The controller first receives an identifier from peripheral devices attached to the controller port. The controller then interprets the received identifiers to determine a maximum communications speed for each device. Next, the controller and the attached peripheral devices are configured to communicate at the maximum communications speed of the slowest device. This guarantees that all messages sent by the controller are compatible with all peripheral devices. Devices subsequently coupled to the communications port are considered by the controller, and the port and other devices are reconfigured as necessary to ensure the fastest possible communications speed.

31 Claims, 4 Drawing Sheets

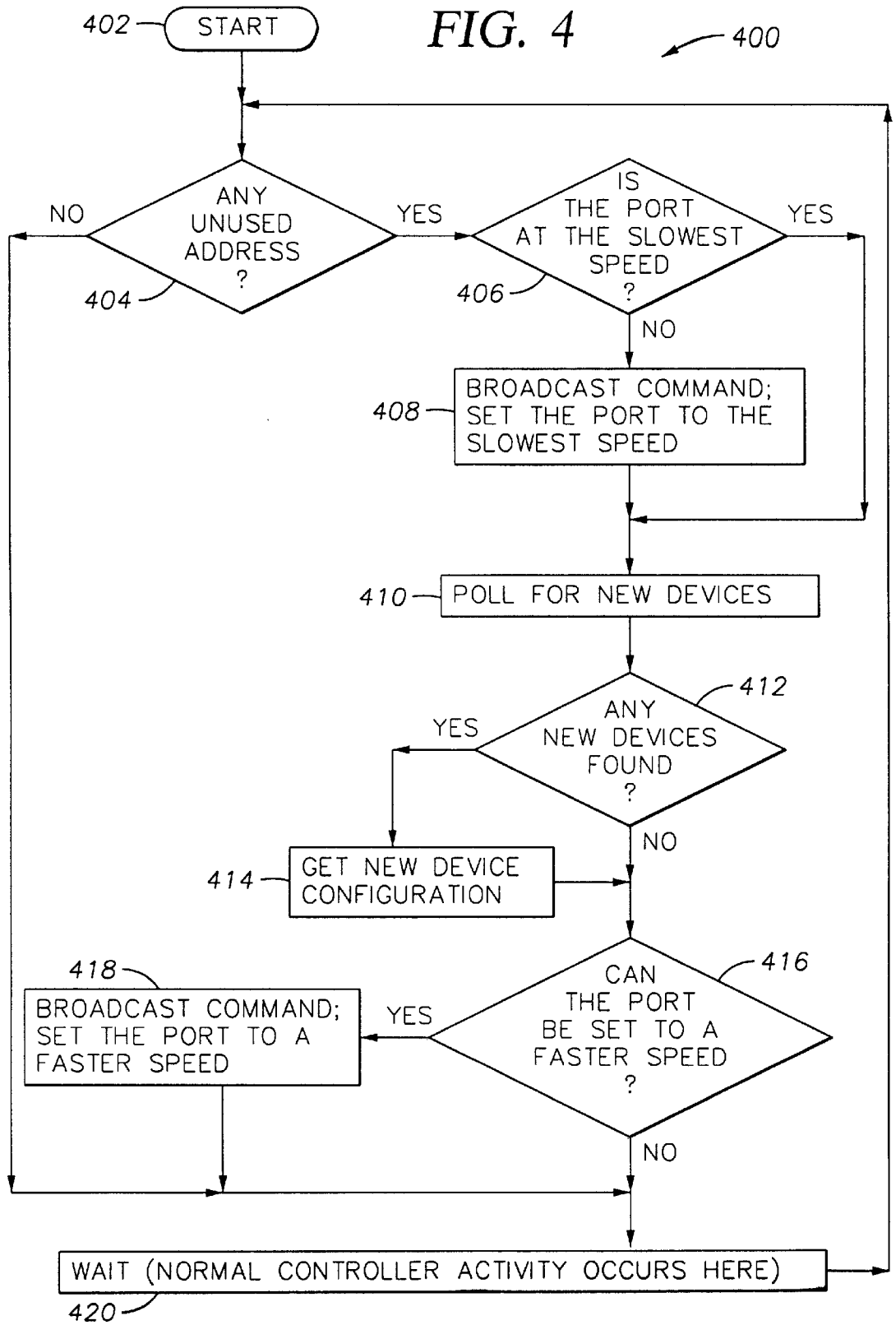

COMPUTER SYSTEM WITH PERIPHERAL DEVICE CHARACTERISTIC SENSING AND AUTOMATIC COMMUNICATIONS SPEED SETTING

BACKGROUND OF THE INVENTION

1. Field of the Invention

The present invention relates to computer systems with multiple peripheral devices such as printers and video displays. More particularly, the invention concerns an apparatus, article of manufacture, and method in which a computer system automatically senses characteristics of a potentially diverse assortment of attached peripheral devices and maximizes the communications speed between these devices and a central controller.

2. Description of the Related Art

Many offices today utilize computer systems with a centralized processing unit and distributed peripheral devices. This is often a cost effective approach, because multiple users can share one expensive, powerful central processing unit ("CPU"). Individual users may have their own inexpensive components, such as graphical interfaces and printers. These components are typically coupled to the CPU by connecting cable, which may be tens, hundreds, or even thousands of feet long.

In some systems with distributed-peripherals, the devices are coupled to communications ports of the CPU. Each port may be used by one device alone, or shared by multiple devices. With a "point-to-point" arrangement, a port is used by one device. With a "cable thru" configuration (also called "multi-drop"), a port may be shared by multiple devices, connected in daisy chain fashion. An exemplary protocol for communications between a CPU and distributed peripheral devices is the IBM 5250 Twinaxial protocol (called "Twinax").

For many applications, known distributed-peripheral arrangements are completely satisfactory. However, competition in the industry spurs engineers to constantly seek improvements to these systems. Communication speed is one design feature that is important to engineers and customers alike. Faster communications between a CPU and its peripheral devices leave more time for the CPU and peripheral devices to complete their respective jobs. It also means that the customer does not have to wait as long for data or images to be transferred between the CPU and peripheral device Usually, however, the communications port and its attached peripheral devices are built to communicate at one pre-established, fixed rate. Thus, improvements in communications speed are only possible by upgrading the communications port and the peripheral devices. Components that use the current Twinax protocol, for example, communicate at one million bits per second (i.e., 1 Mbps). For some users, it may be prohibitively expensive to upgrade components very often. Furthermore, it may be difficult to keep track of which components have which levels of communication speed.

SUMMARY OF THE INVENTION

Broadly, the present invention concerns a computer system that automatically senses characteristics of a potentially diverse assortment of peripheral devices serially connected to a common communications port, and automatically maximizes the communications speed with the devices. Coupled in daisy chain fashion to the communications port, all peripheral devices receive every signal issued from the controller port, each device responding only to signals addressed to that device.

The controller first receives a device identifier from each peripheral device attached to the controller port. The controller may obtain the device identifiers, for example, by polling the peripheral devices to obtain an electronic code. The controller then interprets the received device identifiers to determine a maximum communications speed for each device. The maximum communications speed may be contained in the electronic code, for example, or available by using a lookup table to cross-reference the device identifier to a maximum communications speed listing.

Next, the controller and the attached peripheral devices are configured to communicate at the maximum communications speed of the slowest device attached to the port. This guarantees that all messages sent by the controller are compatible with all peripheral devices. The peripheral devices attached at this time may be referred to as active devices.

After configuring the port and the devices for optimal communications, the controller determines whether any new peripheral devices in addition to the active devices have been attached to the port or powered on. This may be performed by the controller polling the devices, the devices self-announcing their presence to the controller, or another suitable technique. This may occur, for example, on a periodic basis or according to another predetermined schedule. Preferably, the detection of new devices is performed at a relatively slow speed that is recognized by all possible makes and models of peripheral device, both slow and fast. If new devices are present, the controller obtains a device identifier from all-new peripheral devices attached to the controller port. The controller then interprets the device identifiers to determine a maximum communications speed for each device. Then the controller and all attached devices are configured to communicate at the maximum communications speed of the slowest device connected to the port.

One embodiment of the invention, then, concerns a method for conducting communications between a controller and peripheral devices attached to a parallel communications port of the controller, in a system where all devices receive each signal from the controller port and each device responds only to signals addressed to that device. In another embodiment, the invention may be implemented to provide an apparatus utilizing such a communications technique. In still another embodiment, the invention may be implemented to provide an article of manufacture comprising a data storage device tangibly embodying a program of machine-readable instructions executable by a digital data processing apparatus to perform method steps for conducting communications as described above.

The invention affords its users with a number of distinct advantages. Chiefly, the invention facilitates faster communications between a controller and its attached peripheral devices. Advantageously, the communications speed is maximized, as the controller automatically conducts communications at the fastest speed that is compatible with all attached devices. Therefore, peripheral devices with different communications capabilities can share a single communications path to the controller. Another benefit is that the controller performs configuration and reconfiguration automatically "on-the-fly", so that devices may be added or removed from the system, or simply powered on or powered off, without disrupting its operation. The invention also provides various other advantages, as described in greater detail below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 4 is a flowchart illustrating an illustrative sequence of method steps according to the invention.

DETAILED DESCRIPTION OF THE PREFERRED EMBODIMENTS

HARDWARE COMPONENTS & INTERCONNECTIONS

Computer System

Figure 1:
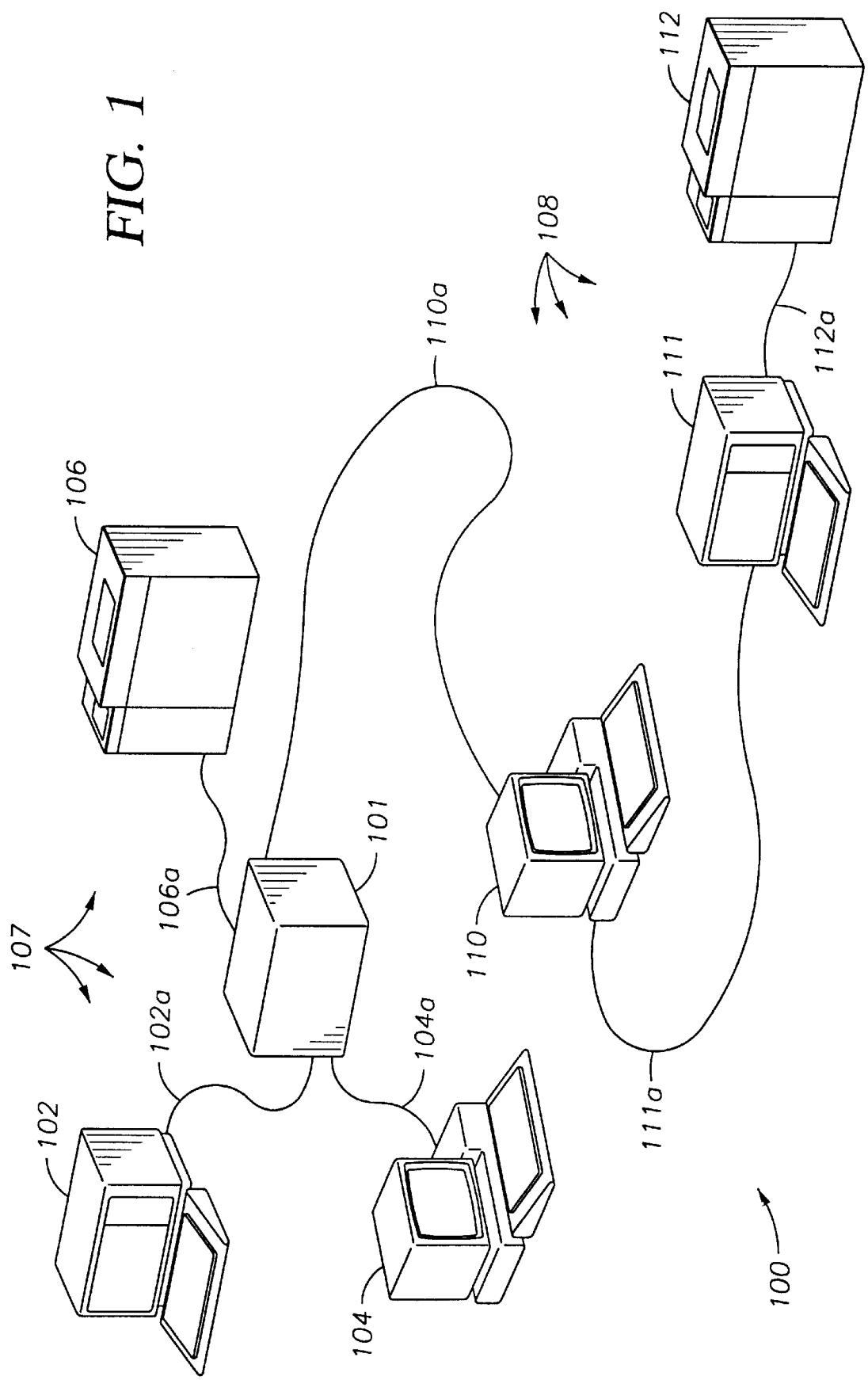
FIG. 1 is a diagram showing the hardware components of a distributed-peripheral computer system according to the invention.

One aspect of the invention concerns a distributed-peripheral computer system, a specific example of which is shown by the various hardware components and interconnections of the computer system 100 of FIG. 1. The system 100 illustrates the type and arrangement of components suitable for use with the IBM "Twinax" protocol, and may comprise an IBM model 5250 Information Display System.

The system 100 is functionally centered about a workstation controller 101, which is described in greater detail below. The workstation controller 101 may be an independent unit or part of a host computer system, for example. The controller 101 is coupled to a number of different peripheral devices, including a number of "point-to-point" peripheral devices 107. These peripheral devices 107 include a display station 102, printer 106, and a personal computer ("PC") 104 with a 5250 Twinax emulator card such as the IBM 5250 Express family of adapters. As described in greater detail below, each of these peripheral devices is separately coupled to a different port (not shown) of the controller 101. These connections are made by cables 102a, 104a, and 106a, which may comprise a suitable type of cable such as IBM Twinaxial cable.

Also coupled to the controller 101 are a number of "cable thru" peripheral devices 108, including a display station 110, a PC 111 with a 5250 Twinax emulator card such as the IBM 5250 Express family of adapters, and printer 112. These peripheral devices are coupled in daisy-chain fashion, where only the device 110 is coupled to the controller 101. Namely, the device 110 is coupled to a port (not shown) of the controller, while the device 111 is coupled to the device 110 and the device 112 is coupled to the device 111. These connections are made by cables 110a, 111a, and 112a, which may comprise a suitable type of cable such as IBM Twinaxial cable. As known in the art, Twinaxial cable refers to a shielded twisted pair of wires, where digital signals are transmitted over the wires by applying differential voltages across the wires.

Controller

Figure 2A:
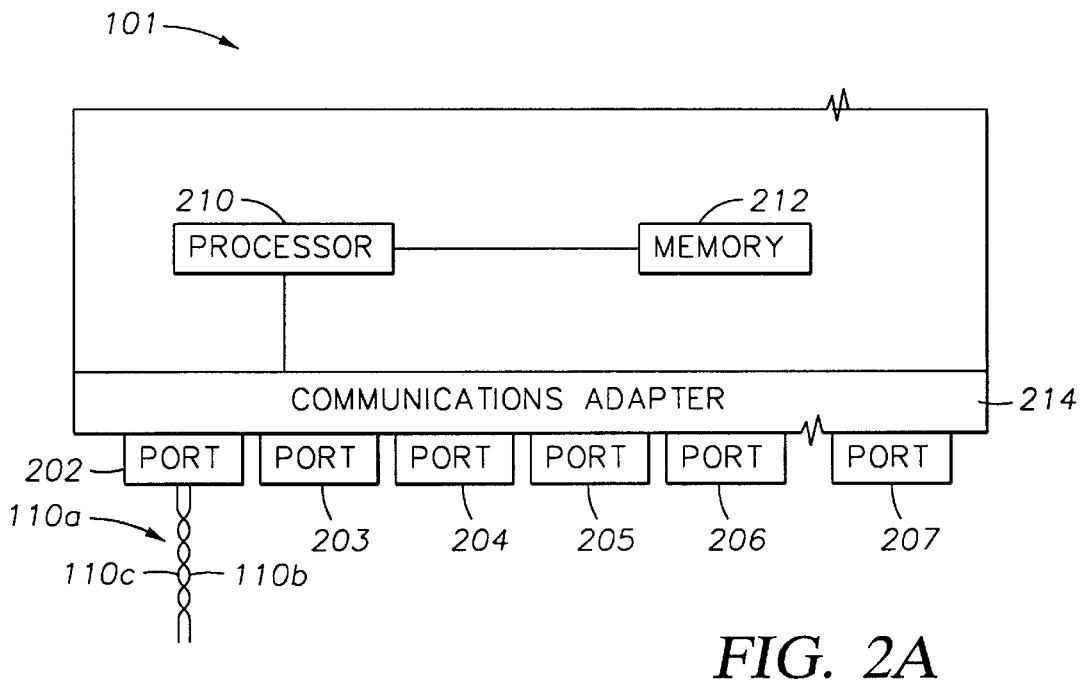
FIG. 2A is a more detailed diagram of the workstation controller of the invention.

Preferably, the controller 101 comprises a digital processing machine such as personal computer, mid-range computer, mainframe computer, computer workstation, host computer, or other suitable apparatus. As a particular example, the controller 101 may comprise an IBM AS/400 model 9401, 9402, 9404, or 9406 computer, System/38 model 5381 or 5382 computer, or a System/36 model 5360, 5362, or 5363, or 5364 computer. As shown in FIG. 2A, the controller 101 includes a processor 210, a storage unit 212, and a communications adaptor 214. The communications adapter 214 provides serialization and deserialization of data to and from attached communications ports 202–207. The communications ports 202–207 number six in the present example, although another number of ports may be used in actual implementation. Each port is capable of communicating with one device in point-to-point fashion, or with multiple devices in a cable thru arrangement.

To illustrate an exemplary port in greater detail, reference is made to the port 202. The port 202 may be part of a communications card such as an IBM feature number 2720, 2722, or 6180, or another suitable communications port. The port 202 is coupled to the cable 110a, which includes the twisted pair of wires 110b and 110c. Ordinarily skilled artisans, however, may use a different type of port and/or cable without departing from the scope of the present invention.

In the illustrated example, the port 202 is capable of addressing seven different peripheral devices coupled in a cable-thru arrangement, by transmitting a three bit digital address over the cables 110a/111a/112a. Each signal transmitted by the port 202 is received by all peripheral devices attached to the port 202. However, each device responds only to signals containing the address of that specific device. In the present example, the devices respond to address-0, address-1, address-2, address-3, address-4, address-5, or address-6. In certain known applications, such as the IBM Model 5250 Information Display System, address-7 (i.e., binary "111") may be used to indicate an end of transmission. As part of this invention, however, it is also used as a universal address to address all cable-thru devices on a given port. Thus address-7 represents a broadcast command, to which all attached peripheral devices on a given port respond.

In accordance with Twinaxial protocol, the port 202 may send and receive messages, each message having one or more "frames", each frame containing a number of predefined fields. The first frame in a message is preceded by a bit-synchronization field and a frame synchronization field. Each frame includes one synchronization bit, a multi-bit command/data/status field, a three-bit address field, a parity field, and other suitable fields. However, this communications format is merely given as an illustrative example, and many other formats may by implemented in the present invention.

Peripheral Devices

As mentioned above, each of the peripheral devices 102, 104, 106, and 110–112 generally comprises a digital processing machine, such as a display station, printer, personal computer, computer workstation, and the like.

Figure 2B:
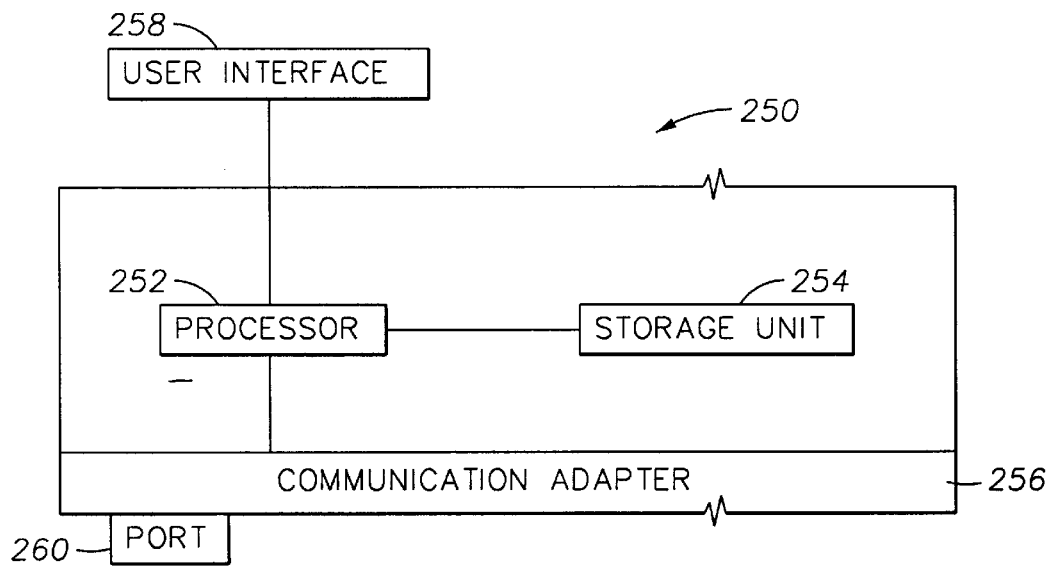
FIG. 2B is a more detailed diagram of a peripheral device of the invention.

Referring to FIG. 2B, an exemplary peripheral device 250 includes a processing unit 252 coupled to a storage unit 254 and a communications adapter 256. The processing unit 252 may be further coupled to a user interface 258, such as a computer terminal, keyboard, text display, graphics display, voice recognition unit, or any other suitable means for sending and/or receiving information to a human operator.

The communications adapter 256 is further coupled to one or more communications ports, such as the port 260. The communications port 260 may comprise an adapter card of the IBM Express family, or another suitable communications port. In a point-to-point configuration, each device's port communicates directly with the workstation controller 101. In a cable-thru arrangement, one device's port communicates directly with the controller, and the remaining devices' ports communicate with the controller 101 via a preceding peripheral device in the daisy chain. The port 260 may be coupled to the controller or another peripheral device using Twinax cable, although ordinarily skilled artisans may use a different type of port and/or cable without departing from the scope of the present invention.

As mentioned above, each peripheral device is responsive to a unique three bit digital address received from the controller 101. Although each device exclusively responds to signals containing the address of that specific device, all devices respond to commands with the universal address. In the present example, the universal address is address-7, i.e., binary 111.

OPERATION

In addition to the various hardware embodiments described above, a different aspect of the invention concerns a method for conducting communications between a controller and peripheral devices attached to a parallel communications port of the controller, in a system where all peripheral devices attached to the port receive each signal from the controller port and each device responds only to signals addressed to that device.

Data Storage Device

This method may be implemented, for example, by operating the controller 101 to execute a sequence of machine-readable instructions. These instructions reside in various types of data storage media. In this respect, one aspect of the present invention concerns an article of manufacture, comprising a data storage medium tangibly embodying a program of machine-readable instructions executable by a digital data processor to perform method steps for conducting communications between a controller and peripheral devices attached to a parallel communications port of the controller, in a system where all peripheral devices attached to the port receive each signal from the controller port and each device responds only to signals addressed to that device.

Figure 3:
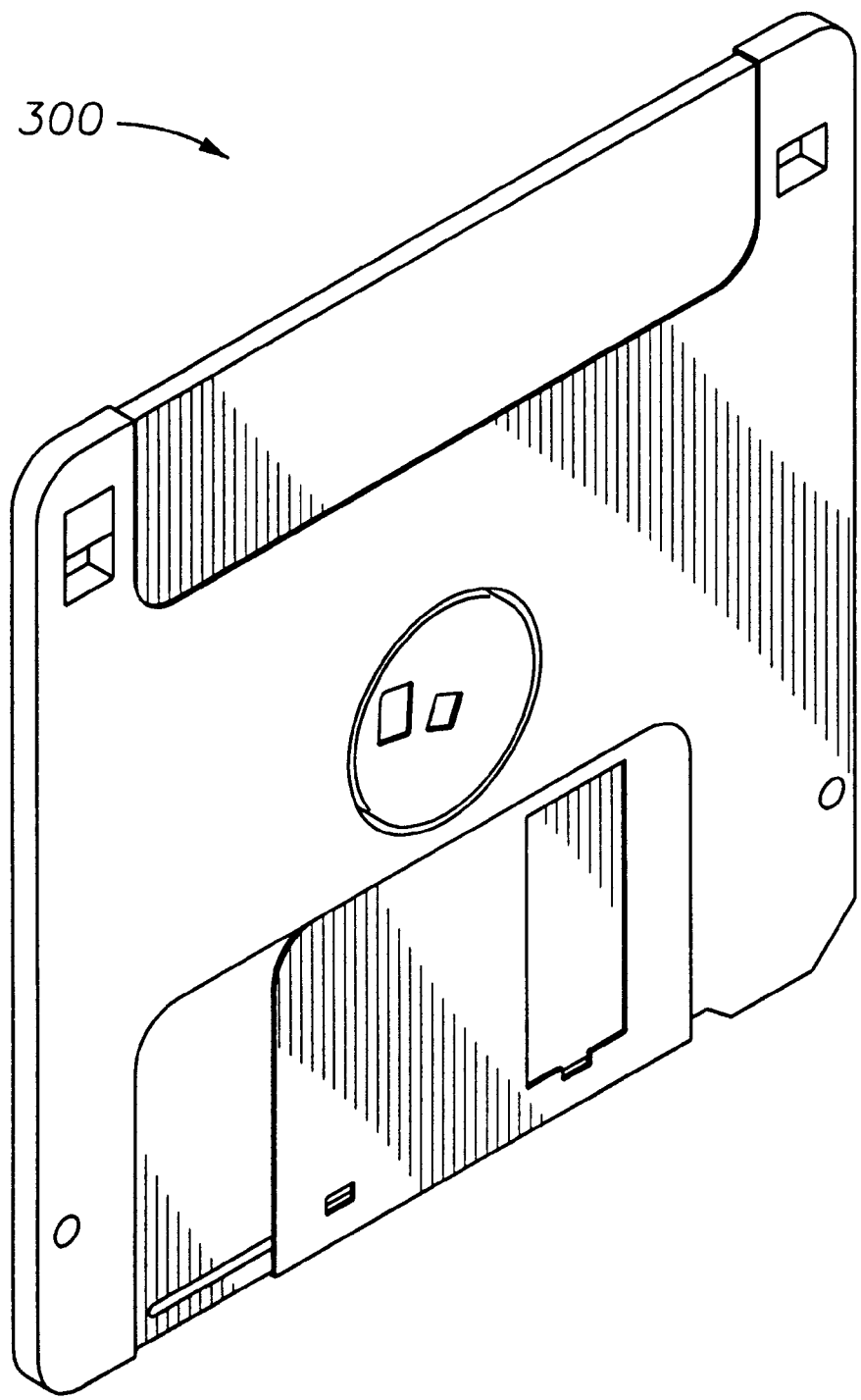
FIG. 3 is a diagram of an illustrative article of manufacture according to the invention.

This data storage medium may comprise, for example, RAM contained within or embodying the storage unit 212. Alternatively, the instructions may be contained in another data storage medium, such as a magnetic data storage diskette 300 (FIG. 3). Whether contained in the storage unit 212 or elsewhere, the instructions may instead be stored on another type of data storage medium such as DASD storage (e.g. a conventional "hard drive" or a RAID array), magnetic tape, electronic read-only memory (e.g. ROM), optical storage device (e.g. WORM), paper "punch" cards, or other data storage media. In an illustrative embodiment of the invention, the machine-readable instructions may comprise lines of compiled C++ language code.

Overall Sequence of Operation

FIG. 4 shows a sequence of method steps 400 to illustrate one example of the method aspect of the present invention. For ease of explanation, but without any limitation intended thereby, the example of FIG. 4 is described in the context of the computer system 100 described above. As mentioned above, the method aspect of the invention conducts communications between a controller and peripheral devices attached to a communications port of the controller, in a system where all peripheral devices attached to the port receive each signal from the controller port and each device responds only to signals addressed to that device.

For explanatory purposes, the following description of this method refers to the devices 110, 111, and 112, which are coupled to the port 202 in cable thru fashion. The steps are initiated in task 402; this may occur, for example, when the controller 101 initially receives power or otherwise "boots up". Alternatively, the routine 400 may be initiated some time during the ongoing operation of the system 100. In this case, the devices already in communications with the port 202 are called "active devices".

Checking For Newly Added Peripheral Devices

Following task 402, the controller 101 determines whether the conditions are right for the addition of one or more "new" peripheral devices. "New" peripheral devices are those devices not already communicating with the port 202, in contrast with the "active" devices. "New" devices include peripheral devices newly attached to the port 202 as well as devices that were previously powered-off and recently powered-on again. In query 404, the controller 101 asks whether the port 202 has any unused addresses. In other words, query 404 determines whether any of the addresses (e.g., address-0, address-1 . . . ) of the port 202 are not being used to communicate with an attached peripheral device.

If all addresses of the port 202 are being used, no new peripheral devices can be added. Therefore, query 404 progresses to task 420, which waits until a predetermined event before returning to task 404 to search for new devices again. Task 420 may be performed so that the controller 101 waits for a predetermined time, such as every ten seconds, or according to another suitable predetermined schedule. During the wait of task 420, the controller 101 may conduct other business unrelated to the routine 400.

However, if query 404 finds one or more unused addresses of the port 202, a process begins to check the port 202 for the possible addition of new devices. According to the present invention, the port 202 can select from multiple different speeds for communications with the attached peripheral devices. At any one time, all attached devices communicate with the port 202 at the same speed. For ease of explanation, the port 202 of the present example uses two different communication speeds: (1) a "faster" mode at 2 Mpbs, and/or (2) a "slower" mode at 1 Mpbs. The invention is not limited to two modes of communication, however. Three or more speeds may be used; the port 202 and peripheral devices, for example, may also support an additional communications mode using 4 Mbps.

After query 404 finds that the port 202 has one or more unused addresses, query 406 asks whether the port 202 is presently configured to communicate in the slower mode. In case a newly added device is not compatible with the faster-mode, the port 202 must use the slower-mode to check for new devices. Thus, if the port is configured for faster-mode operation, task 408 broadcasts a command instructing all peripheral devices coupled to the port 202 to begin communicating in the slower-mode. In the illustrated example, this command is broadcast to all devices by sending the command to address-7. Thus, task 408 enables the system 100 to drop from the faster-mode to the slower-mode to permit new slower-mode devices to join.

If the port 202 and the attached devices are already configured for slower-mode communications, query 408 progresses directly to task 410, skipping task 408.

In task 410, the port 202 polls each unused address to obtain a response from a newly attached device, if any. In addition to newly attached devices, task 410 also finds devices that were previously powered-off but recently powered-on again.

Peripheral devices may be configured to respond to a particular address through an initialization procedure (not shown) in which an operator sets hardware switches of the device or completes a set up program in software. Thus, when the port 202 polls a particular unused address in task 202, a peripheral device will respond if that device has been configured for that particular unused address.

As an alternative to tasks 404–410, new devices may self-announce their own presence to the controller 101, such as by sending the controller 101 information such as a device identifier. Additionally, a number of other suitable techniques may be used without departing from the invention.

After task 410, query 412 determines whether task 410 found any new devices.

New Devices Found—Obtain Device Configuration

If query 412 finds one or more newly attached peripheral devices, the controller 101 in task 414 obtains a device identifier from each newly attached peripheral device. As illustrated, this may be achieved by the controller polling the devices attached to the port 202. As an example, this polling may be achieved by using a "read status command", which is a known command used in IBM 5250 information display systems.

Each device identifier contains various information about the operating characteristics of the corresponding device. For instance, the device identifier may contain data representing the corresponding peripheral device's compatible communications speeds, device type, model ID, screen size supported (for graphics interfaces), and other pertinent characteristics.

Determining Initial Communications Speed

After obtaining the device identifiers (task 414), or after query 412 finds no new devices, query 416 determines whether the port 202 and attached devices can be configured for faster-mode communications.

If query 412 did not find any new devices, query 416 asks whether the port 202 was running in the faster-mode prior to task 408. If so, the port 202 can be reconfigured for faster-mode operation once again without further inquiry.

If query 412 did find one or more new devices, however, query 416 conducts a different inquiry. First, the controller 101 utilizes the device identifiers received in task 414 to determine a maximum communications speed for each device. This may be done by extracting this value from the device identifier, if the speed is represented by a digital electronic code contained in the device identifier. As an alternative, the controller 101 may obtain the maximum communications speed for each device by using a lookup table to cross-reference the device identifier to an appropriate speed listing.

Continuing with query 416, the controller 101 determines whether all devices, including both active and new devices coupled the port 202, are "faster-mode" devices. If true, this would permit the port 202 to operate under the faster-mode. If not, the port 202 and all attached peripheral devices must operate in the slower-mode.

In other words, if any one peripheral device cannot communicate in the faster-mode, the answer to query 416 is "no"—the port 202 cannot be set to the faster-mode. If all devices are compatible with the faster-mode, the port 202 can be configured for faster-mode communications.

Configuring Port/Devices For Maximum Speed

If query 416 finds that faster-mode communications is not possible, the routine 400 advances to task 420, where the controller 101 waits for a predetermined time or event before checking again for newly attached devices in task 404. No configuration of the port 202 or attached peripheral devices is necessary if faster-mode communications are not possible, since these components are already engaged in slower-mode communications.

On the other hand, if query 416 finds that faster-mode communication is possible, the controller 101 in task 418 configures the port 202 and the attached peripheral devices to communicate at the faster-mode. If the port 202 entertains more than two communications speeds, task 418 configures the port 202 and the attached peripheral devices to communicate at the maximum communications speed of the slowest device. Task 418 thus guarantees that all messages sent by the controller are compatible with all peripheral devices.

Task 418 is preferably accomplished by the controller 101 issuing a broadcast command, directed to address-7 over the port 202, instructing all attached peripheral devices to enter the faster-mode. Upon receipt of this command, the attached devices must switch to the faster-mode operation within a predetermined time, such as 30 microseconds.

After task 418, the routine 400 progresses to task 420, which is discussed above.

Error Recovery

Although not shown in FIG. 4, the operational sequence may be implemented with error recovery techniques that advantageously switch between faster-mode and slower-mode. For example, when the controller 101 detects certain types of data transmission errors on a port operating in the faster-mode, the controller may automatically switch the port and attached devices to the slower-mode after exhausting a predetermined number of retry attempts. Thus, an ample attempt is made to recover while remaining in the faster-mode, but the slower-mode is entered in case the problem is aggravated by the faster-mode communications speed.

Also, if a device drops off line for any reason, the device should reset itself to the slower-mode operation before resuming communications. Preferably, the controller 101 always uses the slower-mode of operation when detecting devices and bringing them back on line.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for conducting communications between a controller and peripheral devices attached to a communications port of the controller, where all devices receive each signal from the controller port and each device responds only to signals addressed to that device, said method comprising the steps of:

the controller receiving an identifier from each peripheral device attached to the controller port;

the controller interpreting the identifiers to determine a maximum communications speed for each device; and configuring the port and the attached devices to communicate at the least maximum communications speed among the devices.

2. The method of claim 1, the configuring step comprising the steps of the controller broadcasting to a predetermined universal address via the port, all said peripheral devices being responsive to signals having the universal address.

3. The method of claim 1, each device's identifier including a code representing the maximum communications speed of that device.

4. The method of claim 1, the interpreting step including a step of referencing a lookup table to cross-reference each device's identifier with a maximum communication speed for that device.

5. The method of claim 1, further comprising the steps of, after the configuring step, determining whether one or more new peripheral devices have been activated for communications with the port, and if so, performing steps comprising:
   obtaining an identifier from all new peripheral devices attached to the controller port;
   interpreting the identifiers to determine a maximum communications speed for each device; and
   configuring the port and the attached devices to communicate at the least maximum communications speed among the attached devices.

6. The method of claim 5, the obtaining step comprising the steps of:
   configuring the port and all attached devices to communicate at a predetermined minimum communications speed; and
   polling each new peripheral device to obtain an identifier therefrom.

7. The method of claim 5, the determining step being repeatedly performed according to a predetermined schedule.

8. The method of claim 1, the receiving step comprising the steps of:
   according to a predetermined schedule, the controller polling all devices attached to the controller port to obtain identifiers therefrom.

9. The method of claim 1, the communications port including a communications adapter, the configuring step configuring the communications adapter to communicate at the least maximum communications speed among the peripheral devices.

10. The method of claim 1, each device's maximum communications speed comprising one of the following:
    a predetermined first speed and a predetermined second speed, the second speed being faster than the first speed.

11. An article of manufacture comprising a data storage medium tangibly embodying a program of machine-readable instructions executable by a digital processing apparatus to perform method steps for conducting communications between a controller and peripheral devices attached to a communications port of the controller, where all devices receive each signal from the controller port and each device responds only to signals addressed to that device, said method steps comprising:
    the controller receiving an identifier from each peripheral device attached to the controller port;
    the controller interpreting the identifiers to determine a maximum communications speed for each device; and
    configuring the port and the attached devices to communicate at the least maximum communications speed among the devices.

12. The article of manufacture of claim 11, each device's identifier including a code representing the maximum communications speed of that device.

13. The article of manufacture of claim 11, the interpreting step including a step of referencing a lookup table to cross-reference each device's identifier with a maximum communication speed for that device.

14. The article of manufacture of claim 11, further comprising the steps of, after the configuring step, determining whether one or more new peripheral devices have been activated for communications with the port, and if so, performing steps comprising:
    obtaining an identifier from all new peripheral devices attached to the controller port;
    interpreting the identifiers to determine a maximum communications speed for each device; and
    configuring the port and the attached devices to communicate at the least maximum communications speed among the attached devices.

15. The article of manufacture of claim 14, the obtaining step comprising the steps of:
    configuring the port and all attached devices to communicate at a predetermined minimum communications speed; and
    polling each new peripheral device to obtain an identifier therefrom.

16. The article of manufacture of claim 14, the determining step being repeatedly performed according to a predetermined schedule.

17. The article of manufacture of claim 14, the receiving step comprising the steps of:
    according to a predetermined schedule, the controller polling all devices attached to the controller port to obtain identifiers therefrom.

18. The article of manufacture of claim 11, the communications port including a communications adapter, the configuring step configuring the communications adapter to communicate at the least maximum communications speed among the peripheral devices.

19. The article of manufacture of claim 11, each device's maximum communications speed comprising one of the following:
    a predetermined first speed and a predetermined second speed, the second speed being faster than the first speed.

20. A communications controller, comprising:
    a processing unit; and
    a communications port coupled to the processing unit;
    wherein the processing unit is programmed to perform method steps to conduct communications with a series-connected group of multiple peripheral devices attached to the communications port, said method steps comprising:
    the controller receiving an identifier from each peripheral device attached to the controller port;
    the controller interpreting the identifiers to determine a maximum communications speed for each device; and
    configuring the port and the attached devices to communicate at the least maximum communications speed among the devices.

21. The controller of claim 20, each device's identifier including a code representing the maximum communications speed of that device.

22. The controller of claim 20, the interpreting step including a step of referencing a lookup table to cross-reference each device's identifier with a maximum communication speed of for that device.

23. The controller of claim 20, further comprising the steps of, after the configuring step, determining whether one or more new peripheral devices have been activated for communications with the port, and if so, performing steps comprising:
    obtaining an identifier from all peripheral devices attached to the controller port;
    interpreting the identifiers to determine a maximum communications speed for each device; and
    configuring the port and the attached devices to communicate at the least maximum communications speed among the attached devices.

24. The controller of claim 23, the obtaining step comprising the steps of:

configuring the port and all attached devices to communicate at a predetermined minimum communications speed; and polling each new peripheral device to obtain an identifier therefrom.

25. The controller of claim 23, the determining step being repeatedly performed according to a predetermined schedule.

26. The controller of claim 20, the receiving step comprising the steps of:

according to a predetermined schedule, the controller polling all devices attached to the controller port to obtain identifiers therefrom.

27. The controller of claim 20, the controller port including a communications adapter the configuring step configuring the communications adapter to communicate at the least maximum communications speed among the peripheral devices.

28. The controller of claim 20, each device's maximum communications speed comprising one of the following:

a predetermined first speed and a predetermined second speed, the second speed being faster than the first speed.

29. A communications controller, comprising:

a communications port means for conducting communications with a daisy-chained group of multiple peripheral devices attached to the communications port means; and a processing means coupled to the communications port means for performing method steps to manage operations of the communications port means, said method steps comprising:

the controller receiving an identifier from each peripheral device attached to the port means;

the controller interpreting the identifiers to determine a maximum communications speed for each device; and configuring the port means and the attached devices to communicate at the least maximum communications speed among the devices.

30. A peripheral device for use in a computer system, said device comprising:

a processing unit; and a communications port coupled to the processing unit the port being able to communicate at first and second predetermined rates, the second rate being greater than the first rate;

wherein the processing unit is programmed to perform method steps to conduct communications with a controller, said method steps comprising:

receiving a first command from the controller via the port, said first command instructing the port to begin communications at the first rate;

receiving a predetermined inquiry signal from the controller via the port;

in response to the inquiry signal, at the first rate transmitting an identifier to the controller via the port, the identifier containing a signal representing communications rates with which the port is compatible;

receiving a second command from the controller via the port, said second command instructing the port to begin communications at the second rate; and in response to the second command, conducting future communications of the port at the second rate.

31. The peripheral device of claim 30, the communications port including a communications adapter.

* * * * *